United States Patent
Iwakawa et al.

(10) Patent No.: US 8,009,267 B2
(45) Date of Patent: Aug. 30, 2011

(54) METHOD OF PRODUCING OPTICAL LAMINATE AND IMAGE DISPLAYING APPARATUS

(75) Inventors: Yasuko Iwakawa, Ibaraki (JP); Shusaku Nakano, Ibaraki (JP); Shoichi Matsuda, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 403 days.

(21) Appl. No.: 12/280,096

(22) PCT Filed: Feb. 4, 2008

(86) PCT No.: PCT/JP2008/051727
§ 371 (c)(1),
(2), (4) Date: Aug. 20, 2008

(87) PCT Pub. No.: WO2008/105220
PCT Pub. Date: Sep. 4, 2008

(65) Prior Publication Data
US 2010/0165284 A1 Jul. 1, 2010

(30) Foreign Application Priority Data

Feb. 27, 2007 (JP) ................................. 2007-046351

(51) Int. Cl.
*G02F 1/13* (2006.01)
*C09K 19/04* (2006.01)

(52) U.S. Cl. .................... 349/193; 252/299.01

(58) Field of Classification Search .......... None
See application file for complete search history.

(56) References Cited

U.S. PATENT DOCUMENTS

| | | | | |
|---|---|---|---|---|
| 2,400,877 A | * | 5/1946 | Dreyer | 359/491 |
| 4,031,092 A | * | 6/1977 | Strebel | 544/198 |
| 5,082,588 A | * | 1/1992 | Elliott | 252/299.62 |
| 5,194,975 A | * | 3/1993 | Akatsuka et al. | 349/119 |
| 5,245,456 A | * | 9/1993 | Yoshimi et al. | 349/118 |
| 5,504,603 A | * | 4/1996 | Winker et al. | 349/117 |
| 6,583,284 B1 | | 6/2003 | Sidorenko et al. | |

(Continued)

FOREIGN PATENT DOCUMENTS

JP 2004-20658 A 1/2004
(Continued)

OTHER PUBLICATIONS

International Search Report of PCT/JP2008/051727, date of mailing Mar. 4, 2008.

*Primary Examiner* — Mike Stahl
(74) *Attorney, Agent, or Firm* — Westerman, Hattori, Daniels & Adrian, LLP

(57) ABSTRACT

The present invention provides a method of producing an optical laminate that can produce an optical laminate including an applied film containing a lyotropic liquid crystalline compound so that the thickness of the applied film will be approximately uniform. A method of producing an optical laminate having a base material and an applied film, comprising the step of applying a solution containing at least one kind of lyotropic liquid crystalline compound on the base material so as to form the applied film, wherein the concentration of the lyotropic liquid crystalline compound in the solution is lower than the isotropic phase—liquid crystal phase transition concentration. For example, the concentration of the lyotropic liquid crystalline compound in the solution is from $(C_{IN}-18)\%$ by mass to $(C_{IN}-1)\%$ by mass, where $C_{IN}$ represents the isotropic phase-liquid crystal phase transition concentration.

10 Claims, 1 Drawing Sheet

U.S. PATENT DOCUMENTS

| | | |
|---|---|---|
| 2004/0233362 A1* | 11/2004 | Kashima ................ 349/117 |
| 2004/0248338 A1 | 12/2004 | Sirringhaus et al. |
| 2005/0104037 A1* | 5/2005 | Lazarev et al. ......... 252/299.01 |
| 2005/0109986 A1 | 5/2005 | Dutova et al. |
| 2005/0129878 A1* | 6/2005 | Nazarov et al. ............ 428/1.31 |
| 2005/0253983 A1* | 11/2005 | Carson et al. .............. 349/97 |
| 2006/0176426 A1* | 8/2006 | Jeon et al. ................ 349/116 |
| 2007/0020407 A1 | 1/2007 | Umemoto et al. |
| 2010/0047485 A1* | 2/2010 | Iwakawa et al. ............ 428/1.31 |

FOREIGN PATENT DOCUMENTS

| | | |
|---|---|---|
| JP | 2005-520668 A | 7/2005 |
| JP | 2007-25465 A | 2/2007 |
| JP | 2007-512236 A | 5/2007 |
| WO | 2004-014874 A1 | 2/2004 |
| WO | 2005-051926 A1 | 6/2005 |

* cited by examiner

METHOD OF PRODUCING OPTICAL LAMINATE AND IMAGE DISPLAYING APPARATUS

TECHNICAL FIELD

The present invention relates to a method of producing an optical laminate used in an image displaying apparatus or the like as well as to usage of the optical laminate.

BACKGROUND ART

A liquid crystal displaying apparatus is an apparatus for displaying characters and images by using electrooptical characteristics of liquid crystal molecules. As constituent members of an image displaying apparatus such as a liquid crystal displaying apparatus, a polarizing element (which is also referred to as a polarizer or a polarizing film) that can take out specific polarized light and a retardation element (which is also referred to as a retardation film or an optical compensation layer) that brings about a predetermined retardation are used.

Typically, in such a polarizing element or a retardation element, a polymer film, a film containing a liquid crystalline compound, and the like are used. A polarizing element or a retardation element using a lyotropic liquid crystalline compound among the liquid crystalline compounds is known (patent documents 1 and 2).

Since the lyotropic liquid crystalline compound shows a liquid crystal phase in a solution state, an applied film being a thin film as compared with a polymer film can be formed by applying a compound solution prepared in a liquid crystal phase on a suitable base material, followed by drying. The applied film is utilized for usage such as a polarizing element or a retardation element.

[Patent Document 1]
Japanese Patent Application Laid-Open (JP-A) No. 2002-277636
[Patent Document 2]
Japanese Patent Application Laid-Open (JP-A) No. 2002-241434

SUMMARY OF THE INVENTION

However, an applied film formed from a solution of a lyotropic liquid crystalline compound has a large thickness variation as viewed optically, so that the applied film is inferior in optical uniformity. Therefore, the applied film is not suitable for optical usage such as a polarizing element or a retardation element, so that an improvement thereof is demanded.

An object of the present invention is to provide a method of producing an optical laminate that can produce an optical laminate including an applied film containing a lyotropic liquid crystalline compound so that the thickness of the applied film will be approximately uniform.

The present inventors have made intensive studies on the cause by which the thickness variation is generated in a conventional applied film, and have inferred that upon applying a solution on a base material, the solution is not applied approximately uniformly, thereby completing the present invention.

The present invention provides a method of producing an optical laminate having a base material and an applied film, comprising the step of applying a solution containing at least one kind of lyotropic liquid crystalline compound on the base material so as to form the applied film, wherein the concentration of the lyotropic liquid crystalline compound in the solution is lower than the isotropic phase-liquid crystal phase transition concentration.

The above method of producing an optical laminate can form an applied film in which a liquid crystalline compound is oriented by applying a solution of a lyotropic liquid crystalline compound having a lower concentration than the isotropic phase-liquid crystal phase transition concentration on a base material, followed by drying.

The viscosity of the above solution lower than the isotropic phase-liquid crystal phase transition concentration will be lower as compared with the viscosity of the solution in a liquid crystal phase state. For this reason, the above solution can be applied approximately uniformly on a base material as compared with a conventional method. Therefore, the obtained applied film has an extremely small thickness variation, and can be utilized suitably for optical usage. According to the method of producing an optical laminate of the present invention, an optical laminate being excellent in the uniformity of thickness distribution can be obtained.

Here, conventionally, in a method of forming an applied film using a solution containing a lyotropic liquid crystalline compound, the solution is applied upon preparing the solution to a state exhibiting a liquid crystal phase, so that it has been considered that, unless a solution in a liquid crystal phase is used in this manner, the lyotropic liquid crystalline compound will not be oriented. Regarding this point, the present inventors have found that, even when a solution prepared to have a concentration lower than the isotropic phase-liquid crystal phase transition concentration (namely, the concentration that does not exhibit the liquid crystal phase) is used, an applied film in which the lyotropic liquid crystalline compound is oriented well can be formed. Such knowledge is a matter that the present inventors have found for the first time.

In a preferable embodiment of the production method of the present invention, the concentration of the aforesaid lyotropic liquid crystalline compound in the solution is from $(C_{IN}-18)\%$ by mass to $(C_{IN}-1)\%$ by mass, where $C_{IN}$ represents the isotropic phase-liquid crystal phase transition concentration.

Further, in another preferable embodiment of the production method of the present invention, the concentration of the aforesaid lyotropic liquid crystalline compound in the solution is from 1% by mass to 18% by mass.

Further, in another preferable embodiment of the production method of the present invention, the refractive index ellipsoid of the aforesaid applied film shows a relationship of $nx \geq nz > ny$.

Further, in another preferable embodiment of the production method of the present invention, the aforesaid base material is a polymer film or a laminate containing a polymer film and an orientation film.

Further, in another preferable embodiment of the production method of the present invention, the aforesaid orientation film is a polyimide.

Further, in another preferable embodiment of the production method of the present invention, the aforesaid lyotropic liquid crystalline compound is a polycyclic compound having two or more of aromatic rings and/or heterocyclic rings.

Further, in another preferable embodiment of the production method of the present invention, the aforesaid lyotropic liquid crystalline compound has $-SO_3M$ and/or $-COOM$ in a molecular structure (wherein M represents a counter ion).

Further, in another preferable embodiment of the production method of the present invention, the aforesaid lyotropic liquid crystalline compound contains a polycyclic compound represented by the following formula (I).

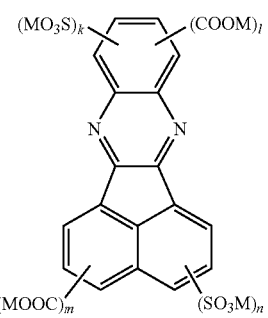

(I)

Where in the formula (I), M represents a counter ion, and k, l, m, and n represent a number of substitutions (k and l are an integer from 0 to 4, and m and n are an integer from 0 to 6), where k, l, m, and n are not simultaneously 0.

Further, the present invention provides an image displaying apparatus having an optical laminate obtained by the production method according to any one of the aforesaid method of producing an optical laminate.

DETAILED DESCRIPTION OF THE INVENTION

The method of producing an optical laminate of the present invention has a step of applying a solution of a lyotropic liquid crystalline compound prepared to have a concentration lower than the isotropic phase-liquid crystal phase transition concentration on a base material so as to form an applied film, and can form an applied film having a uniform thickness by drying the applied film.

Hereinafter, the present invention will be specifically described.

<Optical Laminate of the Present Invention>

An optical laminate obtained by the production method of the present invention has a base material and an applied film containing a lyotropic liquid crystalline compound.

Figure 1A:
FIGS. 1A and 1B are a cross-sectional view showing one example of a layer constitution of the optical laminate of the present invention.
Figure 1B:
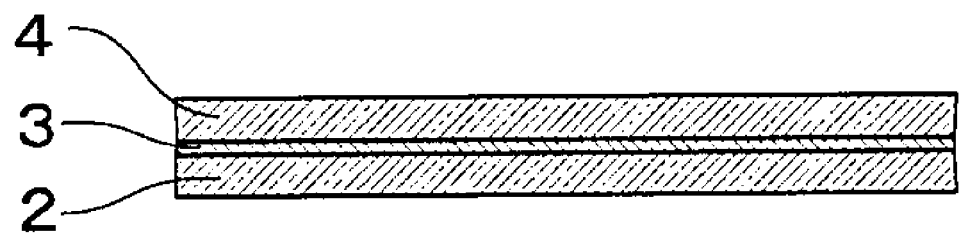

The optical laminate may be a two-layer laminate 1 made of a base material 2 and an applied film 3 as shown in FIG. 1A, or may be a three-or-more-layer laminate 1 including other layer 4 in addition to the base material 2 and the applied film 3 as shown in FIG. 1B. The other layer 4 may be, for example, a retardation film, a polarizing element, an adhesive layer, or the like.

(Base Material)

The above base material is used for uniformly developing a solution containing a lyotropic liquid crystalline compound. The base material is not particularly limited as long as it can develop the solution uniformly, and for example, a synthetic resin film (the term "film" is meant to include those generally referred to as sheets), a glass plate, or the like can be used. In a preferable embodiment, the base material is a single polymer film. In another preferable embodiment, the base material is a laminate including a polymer film. The laminate including a polymer film further preferably includes an orientation film in addition to the polymer film.

The above polymer film is not particularly limited, however, a film being excellent in transparency is preferable (for example, having a haze value of 5% or smaller).

Examples of the polymer film include a film formed from a polymer such as polyester type such as polyethylene terephthalate and polyethylene naphthalate; cellulose type such as diacetylcellulose and triacetylcellulose; polycarbonate type; acryl type such as polymethyl methacrylate; styrene type such as polystyrene and an acrylonitrile-styrene copolymer; olefin type such as polyethylene, polypropylene, polyolefins having a cyclic or norbornene structure, and an ethylene-propylene copolymer; vinyl chloride type; amide type such as nylon and aromatic polyamide; imide type such as polyimide; polyethersulfone type; polyetheretherketone type; polyphenylene sulfide type; vinyl alcohol type; vinylidene chloride type; vinyl butyral type; acrylate type; polyoxymethylene type; epoxy type; and a mixture containing two or more kinds of these polymer or the like. Also, the polymer film may be a film formed from a laminate body of two or more kinds of the above polymer films.

As these polymer films, a stretched film having been subjected to a stretching treatment is preferably used.

The thickness of the above base material can be suitably designed in accordance with the strength and the like. However, in view of thickness reduction and weight reduction, the thickness is preferably 300 μm or smaller, more preferably from 5 to 200 μm, most preferably from 10 to 100 μm.

In the case that the above base material contains an orientation film, this orientation film is preferably subjected to the orientation treatment. Examples of the above orientation treatment include a mechanical orientation treatment such as a rubbing treatment, a chemical orientation treatment such as an optical orientation treatment, and the like.

The mechanical orientation treatment can be carried out by rubbing in one direction with a cloth or the like on one surface of the base material (or one surface of a suitable applied film formed on one surface of the base material). By this, an orientation film can be formed on one surface of the base material. Also, a stretched film having been subjected to a stretching treatment can be used. The applied film or the other film on which the rubbing treatment, the stretching treatment or the like is performed is not particularly limited, so that the above polymer exemplified as the film for the above base material or the like can be used. The orientation film is preferably an imide type polymer in view of the orientation efficiency of the liquid crystalline compound.

The chemical orientation treatment can be carried out by forming an optical orientation film containing an orientation agent on one surface of the base material and radiating light onto the optical orientation film. By this, an orientation film can be formed on one surface of the base material. Examples of the orientation agent include polymers having a photoreactive functional group that generates a photochemical reaction such as a photoisomerization reaction, an optical ring-opening-closing reaction, a photodimerization reaction, a photodecomposition reaction, and an optical Fries rearrangement reaction, and the like. The above optical orientation film can be formed by dissolving an orientation agent into a suitable solvent to form a solution and applying this solution onto a base material.

(Lyotropic Liquid Crystalline Compound)

The lyotropic liquid crystalline compound used in the present invention can be used without any particular limitation as long as it can be applied on a base material and can form an applied film after being dried. The lyotropic liquid crystalline compound may be a material that will be a retardation element after the film is formed, or may be a material that will be a polarizing element after the film is formed.

The above lyotropic liquid crystalline compound is preferably a polycyclic compound. The polycyclic compound has two or more of aromatic rings and/or heterocyclic rings, and preferably has four to eight of aromatic rings and/or heterocyclic rings. Also, it is preferable that the fundamental skeleton of the polycyclic compound has at least a heterocyclic ring, and it is more preferable that the heterocyclic ring has a nitrogen atom. Further, the lyotropic liquid crystalline compound preferably has —SO$_3$M and/or —COOM in its molecular structure (wherein M is the same as in the following general formula (I)).

(Lyotropic Liquid Crystalline Compound that Forms a Retardation Element)

In the case where the above lyotropic liquid crystalline compound is a material that can form a retardation element, the lyotropic liquid crystalline compound preferably contains a quinoxaline derivative unit in a molecular structure. The lyotropic liquid crystalline compound more preferably contains an acenaphtho[1,2-b]quinoxaline derivative unit in a molecular structure, and most preferably contains an acenaphtho[1,2-b]quinoxaline derivative unit having at least one of —SO$_3$M and —COOM in a molecular structure.

The above quinoxaline derivative includes an acenaphtho [1,2-b]quinoxaline derivative represented by the following general formula (I). In the formula (I), k and l are each independently an integer from 0 to 4; m and n are each independently an integer from 0 to 6; and M represents a counter ion. In this regard, k, l, m, and n are not simultaneously 0.

The above M is preferably a hydrogen atom, an alkali metal atom, an alkaline earth metal atom, a metal ion, or a substituted or unsubstituted ammonium ion. The metal ion include, for example, Ni$^{2+}$, Fe$^{3+}$, Cu$^{2+}$, Ag$^+$, Zn$^{2+}$, Al$^{3+}$, Pd$^{2+}$, Cd$^{2+}$, Sn$^{2+}$, Co$^{2+}$, Mn$^{2+}$, Ce$^{3+}$, or the like.

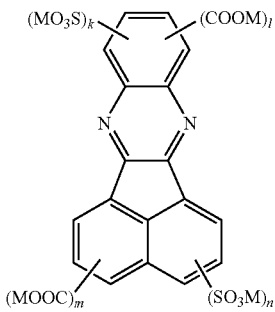

(I)

The above acenaphtho[1,2-b]quinoxaline derivative can be obtained, for example, by sulfonation of acenaphtho[1,2-b] quinoxaline or carboxylic acid thereof with sulfuric acid, fuming sulfuric acid, chlorosulfonic acid, or the like as shown in the following formula (a). In the formula (a), k, l, m, n, and M are similar to those in the general formula (I) (in this regard, k and n are not simultaneously 0).

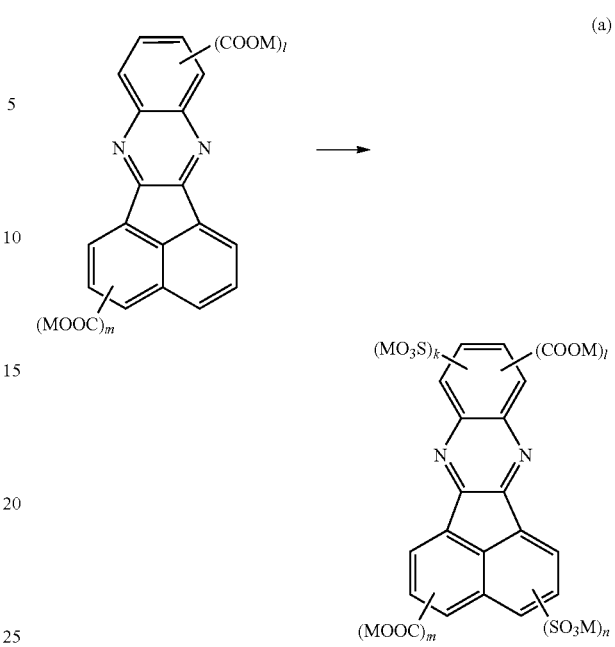

Also, the above acenaphtho[1,2-b]quinoxaline derivative can be obtained, for example, by condensation reaction of sulfo and/or carboxy derivative of benzene-1,2-diamine with sulfo and/or carboxy derivative of acenaphthoquinone as shown in the following formula (b). In the formula (b), k, l, m, n, and M are similar to those in the general formula (I) (in this regard, k, l, m, and n are not simultaneously 0).

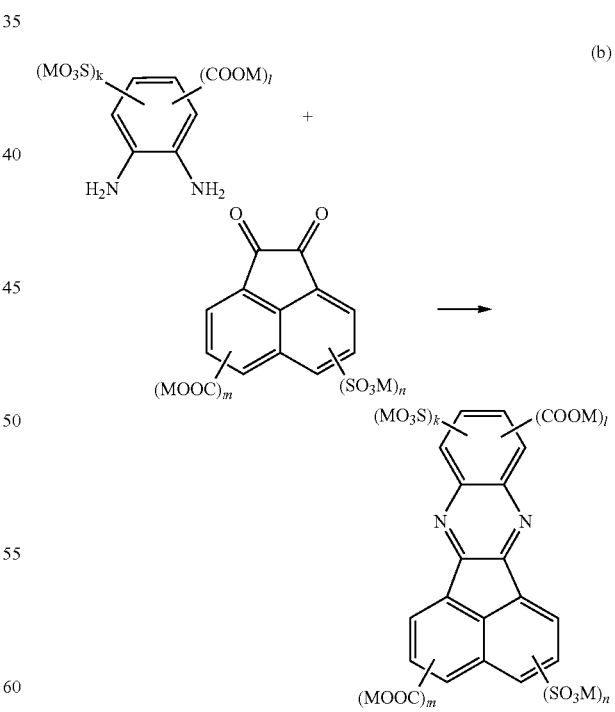

The above acenaphtho[1,2-b]quinoxaline derivative exhibits a liquid crystal phase (namely, lyotropic liquid crystal) in a solution state of a predetermined concentration. Here, this liquid crystal phase is preferably a nematic liquid crystal phase in view of being excellent in orientation property. This nematic liquid crystal phase includes those that form a super molecule and whose formation is in a nematic state.

A retardation element can be fabricated by forming a film from a solution containing the above acenaphtho[1,2-b]quinoxaline derivative. By using the above acenaphtho[1,2-b] quinoxaline derivative, a transparent retardation element having a high in-plane birefringence and having no or little absorption in the visible light region can be fabricated.

The thickness of the retardation element obtained by forming a film from the above solution can be reduced because it is fabricated by application. Further, the retardation element of the present invention is such that the refractive index ellipsoid satisfies a relationship of $nx \geq nz > ny$ ($nx > nz > ny$ or $nx = nz > ny$), and also exhibits a high in-plane birefringence. For this reason, with the retardation element of the present invention, a desired retardation value can be obtained with an outstandingly small thickness as compared with the conventional retardation element. Here, in the present specification, "$nx=nz$" includes a case in which nx and nz are substantially identical in addition to a case in which nx and nz are completely identical. The case in which nx and nz are substantially identical refers, for example, to a case in which Rth [590] is from −10 nm to 10 nm, preferably from −5 nm to 5 nm.

Here, in the present specification, "nx" and "ny" represent the refractive indices in directions that are perpendicular to each other in a plane (here, $nx \geq ny$), and "nz" represents the refractive index in vertical direction relative to the plane.

The transmittance of the above retardation element at the wavelength of 590 nm is preferably 85% or higher, more preferably 90% or higher. The thickness of the retardation element is preferably from 0.05 μm to 5 μm, more preferably from 0.1 μm to 5 μm.

The in-plane birefringence of the retardation element at the wavelength of 590 nm ($\Delta n_{xy}[590]=nx-ny$) is preferably 0.01 or larger, more preferably 0.05 or larger, most preferably from 0.1 to 0.5. Here, the above $\Delta n_{xy}[590]$ can be suitably adjusted within the above range by the molecular structure of the polycyclic compound.

The in-plane retardation value of the above retardation element at the wavelength of 590 nm (Re[590]) can be set to be a suitable value in accordance with an object. The above Re[590] is 10 nm or larger, preferably from 20 nm to 300 nm. Here, the in-plane retardation value (Re[λ]) refers to the retardation value within the plane of a retardation element at the wavelength of λ (nm) at 23° C. The Re[λ] can be determined by Re[λ]=(nx−ny)×d, where the thickness of the retardation element is d (nm).

The Rth[590] of the above retardation element can be set to be a suitable value within a range in which the refractive index ellipsoid satisfies the relationship of $nx \geq nz > ny$. The difference between the in-plane retardation value (Re[590]) and the thickness direction retardation value (Rth[590]) of the retardation element at the wavelength of 590 nm (Re[590]-Rth [590]) is preferably from 10 nm to 200 nm, more preferably from 20 nm to 200 nm. Here, the thickness direction retardation value (Rth[λ]) refers to the thickness direction retardation value of a retardation element at the wavelength of λ (nm) at 23° C. The Rth[λ] can be determined by Rth[λ]=(nx−nz)× d, where the thickness of the retardation element is d (nm).

The Nz coefficient of the above retardation element is preferably from −0.1 to 0.9, more preferably from 0 to 0.9, most preferably from 0.1 to 0.7. When the Nz coefficient is within the above range, the retardation element can be used for optical compensation of liquid crystal cells in various driving modes. Here, the Nz coefficient is a value calculated from Rth[590]/Re[590].

Also, the wavelength dispersion value (D) of the above retardation element is preferably 1.05 or larger, more preferably from 1.06 to 1.15. Here, the wavelength dispersion value (D) is a value calculated from the formula; D=Re[480]/Re [550].

(Lyotropic Liquid Crystalline Compound that Forms a Polarizing Element)

In the case where the above lyotropic liquid crystalline compound is a material that forms a polarizing element, the lyotropic liquid crystalline compound preferably contains an azo derivative unit, an anthraquinone derivative unit, a perylene derivative unit, an indanthrone derivative unit, and/ or an imidazole derivative unit in its molecular structure.

Also, for the lyotropic liquid crystalline compound that forms a polarizing element, it is preferable to use a lyotropic liquid crystalline dichroic dye represented by the following general formula (1).

(Chromogen)(SO$_3$M)$_n$(wherein M represents a cation)    Formula (1)

In the formula (1), M is preferably a hydrogen ion, an ion of metal of group I such as Li, Na, K or Cs, or an ammonium ion.

Further, a chromogen moiety preferably includes an azo derivative unit, an anthraquinone derivative unit, a perylene derivative unit, an indanthrone derivative unit, and/or an imidazole derivative unit.

As for the dichroic dye represented by the general formula (1), the chromogen, such as an azo compound and polycyclic compound structure, becomes a hydrophobic moiety in the solution, and sulfonic acid and a salt of sulfonic acid become a hydrophilic moiety in the solution. With the balance of the hydrophobic and hydrophilic moieties, the hydrophobic moieties and the hydrophilic moieties are respectively combined to develop a lyotropic liquid crystalline phase.

A particular example of the dichroic dye represented by the general formula (1) is compounds represented by the following general formulas from (2) to (8).

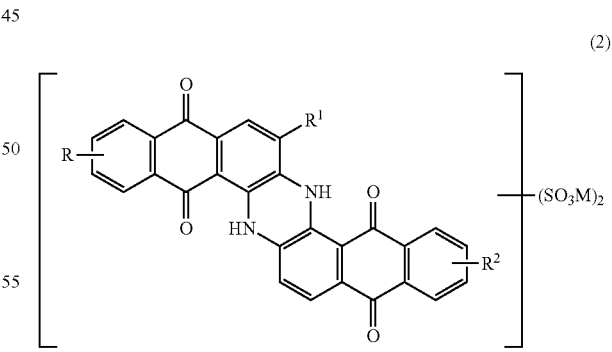

In the general formula (2), R$^1$ represents hydrogen or chlorine, R$^2$ and R represent hydrogen, an alkyl group, ArNH or ArCONH. The alkyl group has preferably a carbon number of 1 to 4, and a methyl group or an ethyl group is more preferable. An aryl group (Ar) is preferably a substituted or unsubstituted phenyl group, and a phenyl group which is unsubstituted or substituted with chlorine at the 4-position is more preferable. M is as defined in the above general formula (1).

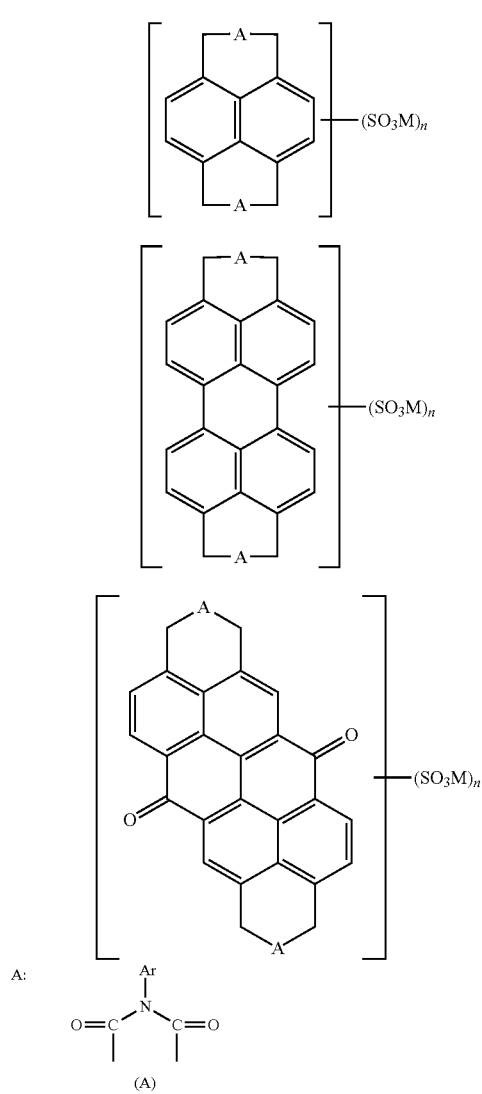

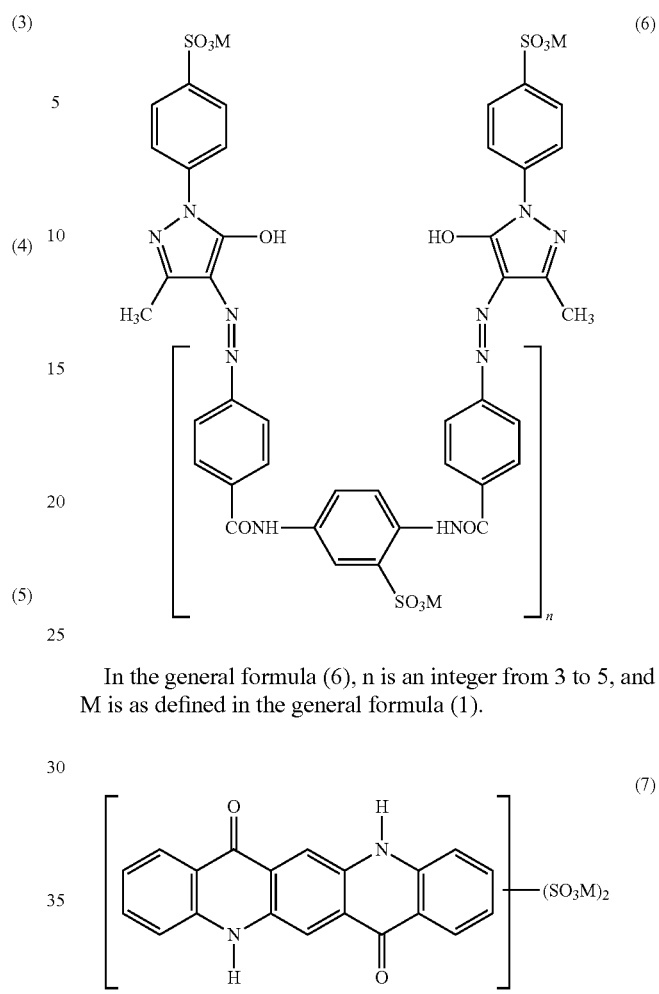

In the general formulas from (3) to (5), A is represented by the formula (A) or (B), and n is 2 or 3. $R^3$ of formula (B) represents hydrogen, an alkyl group, halogen, or an alkoxy group, and Ar of formula (A) represents a substituted or unsubstituted aryl group. The alkyl group preferably has 1 to 4 carbon number, and a methyl group or an ethyl group is more preferable. Halogen is preferably bromine or chlorine. Further, the alkoxy group preferably has 1 or 2 carbon number, and a methoxy group is more preferable. The aryl group is preferably a substituted or unsubstituted phenyl group, and a phenyl group which is unsubstituted, or substituted with a methoxy group, ethoxy group, chlorine or a butyl group at the 4-position, or substituted with a methyl group at the 3-position is more preferable. M is as defined in the above general formula (1).

In the general formula (6), n is an integer from 3 to 5, and M is as defined in the general formula (1).

In the general formula (7), M is as defined in the above general formula (1).

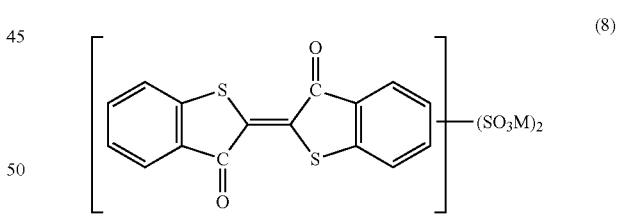

In the general formula (8), M is as defined in the above general formula (1).

A polarizing element can be fabricated by forming a film from a solution containing the above lyotropic liquid crystalline compound. With use of the above lyotropic liquid crystalline compound, a polarizing element having a high polarization degree can be fabricated.

The thickness of the polarizing element obtained by forming a film from the above solution can be reduced because it is fabricated by application.

The polarization degree of the obtained polarizing element is preferably 99% or more, more preferably 99.5% or more. Also, the single-body transmittance of the polarizing element is preferably 40% or more, more preferably 42% or more.

<Method of Producing the Optical Laminate of the Present Invention>

The method of producing the optical laminate of the present invention preferably includes the following step A to step C.

Step A: a step of applying a solution containing at least one kind of a lyotropic liquid crystalline compound on a base material so as to form an applied film.

Step B: a step of drying the aforesaid applied film.

Step C: a step of bringing the surface of the applied film dried in the step B into contact with a solution containing at least one kind of a compound salt selected from the group consisting of aluminum salts, barium salts, lead salts, chromium salts, strontium salts, and compound salts having two or more amino groups in a molecule.

The above base material may be subjected to an orientation treatment on the side on which the solution is to be applied.

Here, hereinafter, for distinction of the terms, the solution containing the lyotropic liquid crystalline compound of the present invention may be referred to as "application solution"; the applied film formed by application of the application solution may be referred to as "wet applied film"; and the applied film in a state in which the wet applied film is dried may be referred to as "dried applied film".

(Step A)

The step A is a step of applying the solution containing the lyotropic liquid crystalline compound on the above base material so as to form a wet applied film on the base material. For the base material, those exemplified above can be used.

The solution containing the lyotropic liquid crystalline compound used in the step A contains one or more kinds of the above lyotropic liquid crystalline compounds and a solvent, and the solvent preferably contains water. The lyotropic liquid crystalline compound can be suitably selected from those exemplified above, and can be used alone or two or more kinds.

The concentration of the lyotropic liquid crystalline compound in the application solution is prepared to be lower than the isotropic phase-liquid crystal phase transition concentration. The concentration is a concentration at which the application solution does not exhibit the liquid crystal phase.

The isotropic phase-liquid crystal phase transition concentration can be confirmed by optical patterns of the solution observed by a polarization microscope.

The concentration of the lyotropic liquid crystalline compound in the application solution is preferably from $(C_{IN}-18)$ to $(C_{IN}-1)\%$ by mass, more preferably from $(C_{IN}-10)$ to $(C_{IN}-2)\%$ by mass. Here $C_{IN}$ represents the isotropic phase-liquid crystal phase transition concentration.

Specifically, the concentration of the lyotropic liquid crystalline compound in the application solution is preferably from 0.1 to 18% by mass, more preferably from 1 to 18% by mass, and most preferably from 5 to 18% by mass. Also, viscosity of the application solution is preferably from 0.1 to 30 mPa·s, more preferably from 0.5 to 3 mPa·s. In this regard, the viscosity is a value measured by a rheometer [manufactured by Haake Co., Ltd., product name: RHEOSTRESS 600. Measurement condition: double cone sensor shear rate 1000 (1/s)].

For the application solution of the present invention, those having a comparatively low concentration are used, so that the application solution is excellent in the fluidity of the solution, and further can be easily prepared in an optimum application viscosity range of an applicator (for example, a coater). Therefore, a uniform applied film can be formed by using the aforesaid application solution.

In the case of using water as a solvent of the application solution, electric conductivity of water is preferably 20 μS/cm or below (lower limit of 0 μS/cm), more preferably from 0.001 to 10 μS/cm, and most preferably from 0.01 to 5 μS/cm. By using a solution in which the electric conductivity of water is within the above-range, an applied film being excellent in uniformity can be formed. Here, the electric conductivity can be measured by using a solution electric conductivity meter [Kyoto Electronics Manufacturing Co., Ltd., product name: CM-117].

Here, the above application solution may contain other arbitrary suitable solvents in addition to water as a solvent. The above solvents include, for example, alcohols, ethers, esters, ketones, cellosolves, and the like. These solvents may be used alone or in combination with two or more kinds.

Also, the above application solution is preferably adjusted to have a pH value of about form 4 to 10, more preferably a pH value of about from 6 to 8.

Further, into the above application solution, an additive may be added. Examples of the additive include a plasticizer, a thermal stabilizer, an optical stabilizer, a lubricant, an antioxidant, an ultraviolet absorber, a flame retardant, a coloring agent, an antistatic agent, a compatibility improving agent, a cross-linking agent, and a thickening agent. The amount of addition of these additives is preferably larger than 0 and 10% by mass.

Further, a surfactant may be added to the application solution. The surfactant is used for improving the wettability and the application property of the polycyclic compound onto the base material surface. As the surfactant, a nonionic surfactant is preferably used. The amount of addition of the surfactant is preferably larger than 0 and smaller than 5% by mass.

As a method of applying the application solution on one surface of the base material, an applying method using a proper coater is properly used. The coater is, for example, a reverse roll coater, a positive rotation roll coater, a gravure coater, a rod coater, a slot die coater, a slot orifice coater, a curtain coater, or a fountain coater.

(Step B)

The step B is a step of drying the applied film applied on the base material.

The above wet applied film is suitably dried by a suitable method. The drying method includes, for example, drying means such as an air-circulation type thermostatic oven by which hot air or cool air circulates, a heater using a microwave, a far infrared ray, or the like, a roll heated for temperature adjustment, a heat pipe roll, or a metal belt.

The drying temperature is below or equal to the isotropic phase transition temperature of the solution, and it is preferable to dry the applied film by gradually raising the temperature from low temperature to high temperature. The above drying temperature is preferably from 10 to 80° C., more preferably from 20 to 60° C. Within such a temperature range, a dried applied film having small thickness variation can be obtained.

The drying time can be suitably selected in accordance with the drying temperature and the kind of the solvent; however, the drying time is, for example, 1 to 30 minutes, preferably 1 to 10 minutes in order to obtain a dried applied film having small thickness variation.

The above wet applied film will have a higher concentration in the drying process and, in accordance therewith, the lyotropic liquid crystalline compound will be oriented and will be fixed in that state.

The thickness of the obtained dried applied film is preferably from 0.05 to 10 μm, more preferably from 0.1 to 5 μm.

The residual solvent amount of the dried applied film is preferably 1% by mass or below, more preferably 0.5% by mass or below.

(Step C)

The step C is a step of imparting water resistance to the surface of the dried applied film (the surface opposite to the bonded surface of the base material).

Specifically, the surface of the dried applied film formed in the above step B is brought into contact with a solution containing at least one kind of a compound salt selected from the group consisting of aluminum salt, barium salt, lead salt, chromium salt, strontium salt, and compound salts having two or more amino groups within a molecule.

Examples of the above compound salt include aluminum chloride, barium chloride, lead chloride, chromium chloride, strontium chloride, 4,4'-tetramethyldiaminodiphenylmethane hydrochloride, 2,2'-dipyridyl hydrochloride, 4,4'-dipyridyl hydrochloride, melamine hydrochloride, tetraminopyrimidine hydrochloride, and the like. By forming a layer of such a compound salt on the dried applied film surface, the surface of the dried applied film can be made insoluble or slightly soluble to water. Therefore, water resistance can be imparted to the dried applied film.

In the solution containing the above compound salt, the concentration of the compound salt is preferably from 3% to 40% by mass, more preferably from 5% to 30% by mass.

As a method of bringing the solution containing the above compound salt into contact with the surface of the above dried applied film, one can adopt, for example, a method of applying the solution containing the above compound salt onto the surface of the dried applied film, a method of immersing the dried applied film into the solution containing the above compound salt, or the like. In the case that these methods are adopted, the surface of the dried applied film is preferably dried in advance after being washed with water or an arbitrary solvent.

<Use of the Optical Laminate>

The usage of the optical laminate of the present invention is not particularly limited; however, it is representatively used as an optical member ($\lambda/4$ plate, $\lambda/2$ plate, viewing angle enlarging film, polarizing film or the like) of a liquid crystal displaying apparatus.

In one embodiment, when the optical laminate of the present invention is a retardation element, a polarizing element may be laminated thereon for use as a polarizing plate. Hereinafter, this polarizing plate will be described.

The above polarizing plate includes at least the optical laminate of the present invention and a polarizing element. This polarizing plate may include other optical laminates, other retardation elements, arbitrary protective layers, and the like. For practical use, an arbitrary suitable adhesive layer is disposed between the layers of the constituent members of the above polarizing plate, whereby each layer is adhered to each other.

The polarizing element is an optical member having a function of converting a natural light or a polarized light into a linearly polarized light. As the polarizing element, an arbitrary suitable one can be adopted. As the above polarizing element, a stretched film having, as a major component, a polyvinyl alcohol type resin containing iodine or a dichroic dye is preferably used. The thickness of the above polarizing element is typically from 5 μm to 50 μm.

As the above adhesive layer, an arbitrary suitable one can be selected as long as it adheres and integrates the surfaces of adjacent members with a practically sufficient adhering strength and a adhering time. Examples of the material for forming the above adhesive layer include a adhesive agent, a pressure-sensitive adhesive agent, and an anchor coat agent. The above adhesive layer may be a multiple-layer structure in which an anchor coat agent layer is formed on a surface of a body, and a adhesive layer or a pressure-sensitive adhesive layer is formed thereon, or may be a thin layer (also referred to as a hair line) that is unrecognizable by a naked human eye. The adhesive layer disposed on one side of the optical laminate and the adhesive layer disposed on the other side may be the same or may be different from each other.

In another embodiment, when the optical laminate of the present invention is a polarizing element, a retardation element may be laminated thereon for use as a polarizing plate. This polarizing plate may include other optical laminates, other retardation elements, arbitrary protective layers, and the like as well.

The usage of the optical laminate of the present invention is not particularly limited, the optical laminate can be used as an optical member of various image displaying apparatus preferably.

The image displaying apparatus of the present invention includes an organic EL display, a plasma display, and others in addition to a liquid crystal displaying apparatus. A preferable use of the image displaying apparatus is a television set (particularly a large-scale television set having a screen size of 40 inches or more). In the case that the image displaying apparatus is a liquid crystal displaying apparatus, preferable uses thereof are OA apparatus such as a personal computer monitor, a notebook personal computer, and a copying machine; portable apparatus such as a portable telephone, a clock, a digital camera, a portable digital assistance (PDA), and a portable game machine; a home-use electric apparatus such as a video camera and an electronic range; apparatus to be mounted on a vehicle such as a back monitor, a monitor for a car navigation system, and a car audio device; an exhibition apparatus such as an information monitor for commercial shops; guarding apparatus such as a monitor for supervision; and assisting and medical apparatus such as a monitor for assisting senior persons and a monitor for medical use.

EXAMPLES

Hereafter, the present invention will be further described by showing Examples and Comparative Examples. However, it is to be noted that the present invention is not limited to these Examples. Here, the measuring methods used in Examples are as follows.

(1) Method of Measurement of nx, ny, nz, Re[590], Rth[590], and Nz Coefficient:

With use of the trade name "KOBRA21-ADH" manufactured by Ohji Scientific Instruments Ltd., nx, ny, nz, Re[590], Rth[590], and Nz coefficient were measured at 23° C. Here, as the average refractive index, a value obtained by measurement with use of Abbe refractometer (manufactured by Atago Ltd., product name: "DR-M4") was used.

(2) Method of Measurement of Single-Body Transmittance and Polarization Degree:

With use of a spectrophotometer [manufactured by Murakami Color Research Laboratory Co., Ltd., product name: "DOT-3"], measurement was made under the condition of 23° C. Here, for the measured values of the polarization degree and the single-body transmittance, the wavelength of 550 nm was used as a standard.

The single-body transmittance is a Y value of tristimulus value based on the two-degree field of JIS Z 8701-1995.

The polarization degree can be calculated by measuring parallel transmittance ($H_0$) and orthogonal transmittance ($H_{90}$) and using the formula: polarization degree (%)={($H_0$−

$H_{90}/(H_0+H_{90})\}^{1/2} \times 100$. The parallel transmittance ($H_0$) is a value of the transmittance of a parallel-type laminate fabricated by laminating two of the optical laminates that are measurement object such that the absorption axes thereof will be parallel to each other. The orthogonal transmittance ($H_{90}$) is a value of the transmittance of an orthogonal-type laminate fabricated by laminating two of the optical laminates that are measurement object such that the absorption axes thereof will be orthogonal to each other. Here, these transmittances are Y values subjected to vision sensitivity correction by the two-degree field (C light source) of JIS Z 8701-1982.

(3) Measurement of Thickness and Thickness Variation:

The film thickness of the sample was measured by using a touch probe type surface shape measuring tool [DEKTAK] manufactured by Alback Co., Ltd. For the measurement of the film thickness, a step was measured after wiping a part of the application film out with a waste cloth containing water.

For the thickness variation, a sum of nine sites (interval of each point being 3 cm), namely, three sites in the longitudinal direction and three sites in the lateral direction, were arbitrarily selected from within the surface (12 cm×12 cm) of the sample, and the difference between the maximum value and the minimum value thereof was determined as the thickness variation.

Synthesis Example 1

Synthesis of acenaphtho[1,2-b]quinoxaline

To a reaction vessel equipped with a stirrer, 5-liter of glacial acetic acid and 490 g of purified acenaphthenequinone were added and stirred for 15 minutes under nitrogen bubbling to obtain an acenathphenequinone solution. Similarly, to another reaction vessel equipped with a stirrer, 7.5-liter of glacial acetic acid and 275 g of o-phenylenediamine were added and stirred for 15 minutes under nitrogen bubbling to obtain an o-phenylenediamine solution. Thereafter, while stirring under nitrogen atmosphere, the o-phenylenediamine solution was added to the acenaphthenequinone solution gradually over one hour, and then allowed to react by continuing to stir for 3 hours. After ion exchange water was added to the obtained reaction liquid, the precipitate was filtrated to obtain a crude product. This crude product was recrystallized with a heated glacial acetic acid for purification.

Synthesis Example 2

Synthesis of acenaphtho[1,2-b]quinoxaline-2,5-disulfonic acid

As represented by the following reaction pathway, after 30% fuming sulfuric acid (2.1-liter) was added to 300 g of acenaphtho[1,2-b]quinoxaline obtained by synthesis example 1 and the mixture was stirred at room temperature for 24 hours, the resultant was heated to 130° C. and stirred for 32 hours for reaction. While keeping the obtained solution at 40° C. to 50° C., 4.5-liter of ion exchange water was added for dilution, and the resultant was further stirred for 3 hours. The precipitate was filtered and recrystallized with sulfuric acid to obtain acenaphtho[1,2-b]quinoxaline-2,5-disulfonic acid as represented by the following formula (c).

This reaction product was dissolved in 30-liter of ion exchange water (electric conductivity: 0.1 μS/cm) and further was neutralized by addition of an aqueous solution of sodium hydroxide. The obtained aqueous solution was put into a supply tank and, with use of a high-pressure RO element testing apparatus equipped with a reverse osmosis filter manufactured by Nitto Denko Corporation [trade name: "NTR-7430 filter element"], was subjected to circulation filtration while adding a reverse osmosis water so that the liquid amount would be constant, thereby removing the residual sulfuric acid until the electric conductivity of the exhaust liquid would be 13.6 μS/cm.

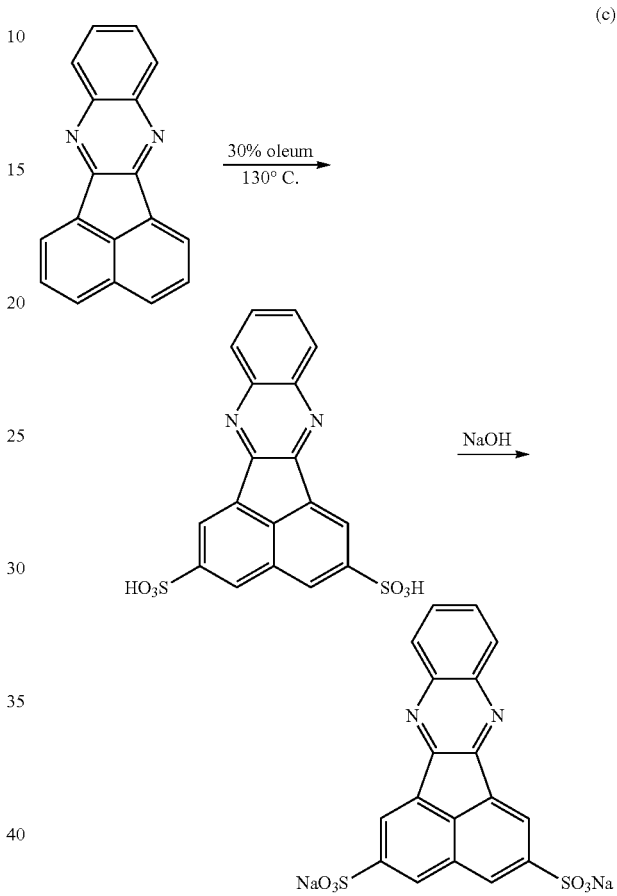

(c)

Synthesis Example 3

Synthesis of acenaphtho[1,2-b]quinoxaline-2-sulfonic acid

As represented by the following reaction pathway, 30% fuming sulfuric acid (2.1-liter) was added to 300 g of acenaphtho[1,2-b]quinoxaline obtained by synthesis example 1 and the mixture was stirred at room temperature for 48 hours for reaction. While keeping the obtained solution at 40° C. to 50° C., 4.5-liter of ion exchange water was added for dilution, and the resultant was further stirred for 3 hours. The precipitate was filtered to obtain acenaphtho[1,2-b]quinoxaline-2-sulfonic acid as represented by the following formula (d).

This reaction product was dissolved in 30-liter of ion exchange water (electric conductivity: 0.1 μS/cm) and further was neutralized by addition of an aqueous solution of sodium hydroxide. The obtained aqueous solution was put into a supply tank and, with use of a high-pressure RO element testing apparatus equipped with a reverse osmosis filter manufactured by Nitto Denko Corporation [trade name:

"NTR-7430 filter element"], was subjected to circulation filtration while adding a reverse osmosis water so that the liquid amount would be constant, thereby removing the residual sulfuric acid until the electric conductivity of the exhaust liquid would be 8.1 μS/cm.

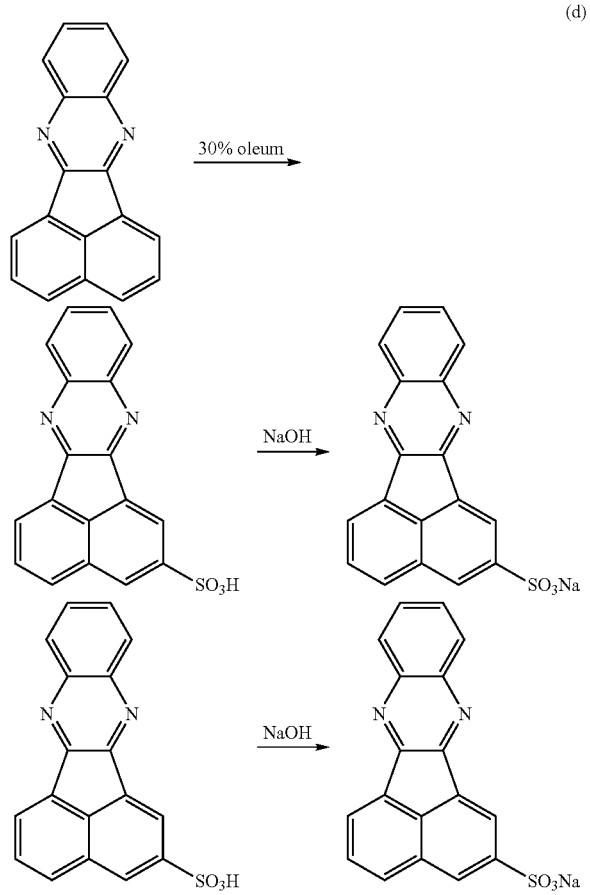

(d)

Reference Example

Preparation of an Aqueous Solution of a Mixture of acenaphtho[1,2-b]quinoxaline-2,5-disulfonic acid and acenaphtho[1,2-b]quinoxaline-2-sulfonic acid The aqueous solutions obtained in the above synthesis example 2 and synthesis example 3 were mixed so that the mixing ratio of the solid components of the acenaphtho[1,2-b]quinoxaline-2,5-disulfonic acid obtained in the above synthesis example 2 and the acenaphtho[1,2-b]quinoxaline-2-sulfonic acid obtained in the above synthesis example 3 would be 65 mass parts:35 mass parts. Next, an application solution was prepared from this aqueous solution with use of a rotary evaporator so that the concentration of the aforesaid quinoxaline compounds (sum of the two kinds) in the aqueous solution would be 25% by mass. Here, when observed with a polarization microscope, this solution exhibited a nematic liquid crystal phase at 23° C.

Example

Both surfaces of an acrylic glass [manufactured by Matsunami Glass Industry Ltd., longitudinal×lateral: 45 mm×50 mm, thickness: 0.7 mm] were washed with use of a supersonic washer. The supersonic washing was carried out at first in acetone for 3 minutes, and then in ion exchange water for 5 minutes. A polyimide was applied with use of a spin coater on the surface of the glass after washing, followed by drying and calcining to form an orientation film. The application condition is at first 5 seconds at 1000 rpm, and thereafter 20 seconds at 3000 rpm. The drying and calcining condition is at first 30 minutes at 120° C., and next 60 minutes at 280° C.

Next, the surface of this orientation film was rubbed in one direction for five times with use of a rubbing cloth to perform a rubbing treatment. Thereafter, the surface of the glass subjected to the rubbing treatment was further subjected to a corona discharge treatment with a corona treater. The corona treating condition is such that the speed is 3 m/min; the output is 0.14 kW; and the discharge amount is 155.6 Wminute/m$^2$.

Next, ion exchange water was further added to the aqueous solution obtained in the above reference example, so as to prepare an application solution so that the concentration of the lyotropic liquid crystalline compound would be 15% by mass. The isotropic phase-liquid crystal phase transition concentration of this aqueous solution at 35° C. is 19% by mass, and the liquid crystal phase is not exhibited at 15% by mass.

The above aqueous solution was applied on the orientation film with a thickness of 4.1 μm in a thermostatic chamber of 23° C. with use of a bar coater [manufactured by BUSCHMAN Corporation, trade name: "mayer rot HS1.5"], and was subjected to natural drying.

The dried applied film obtained in this manner was a retardation element, and the refractive index ellipsoid exhibited a relationship of nx>nz>ny.

Also, the thickness of the obtained dried applied film was 620 nm, and the thickness variation thereof was ±50 nm.

Also, the single-body transmittance of the applied film at the wavelength of 590 nm was 95.6%; the in-plane retardation value at the wavelength of 590 nm (Re[590]) was 203.6; the thickness direction retardation value at the wavelength of 590 nm (Rth[590]) was 53.2; and the Nz coefficient (Rth[590]/Re[590])=0.25.

Comparative Example

An applied film was fabricated by a method similar to that of the Example except that the solution prepared in the Reference Example (namely, one in which the concentration of the lyotropic liquid crystal compound is 25% by mass) was used as it was, as an application solution.

The obtained applied film had a thickness of 620 nm and had a thickness variation of ±150 nm.

What is claimed is:

1. A method of producing an optical laminate having a base material and an applied film, comprising the step of:
applying a solution containing at least one kind of lyotropic liquid crystalline compound on the base material so as to form the applied film,
wherein the concentration of the lyotropic liquid crystalline compound in the solution is lower than the isotropic phase-liquid crystal phase transition concentration and the concentration of the lyotropic liquid crystalline compound in the solution is from ($C_{IN}$–18)% by mass to ($C_{IN}$–1)% by mass, where $C_{IN}$ represents the isotropic phase-liquid crystal phase transition concentration, and
wherein the solution has a viscosity of 0.1 to 30 mPa·s.

2. The method of producing an optical laminate according to claim 1, wherein the concentration of the lyotropic liquid crystalline compound in the solution is from 1% by mass to 18% by mass.

3. The method of producing an optical laminate according to claim 1, wherein the refractive index ellipsoid of the applied film shows a relationship of nx≧nz>ny.

4. The method of producing an optical laminate according to claim 1, wherein the base material is a polymer film or a laminate containing a polymer film and an orientation film.

5. The method of producing an optical laminate according to claim 4, wherein the orientation film is a polyimide.

6. The method of producing an optical laminate according to claim 1, wherein the lyotropic liquid crystalline compound is a polycyclic compound having two or more of aromatic rings and/or heterocyclic rings.

7. The method of producing an optical laminate according to claim 1, wherein the lyotropic liquid crystalline compound has —SO$_3$M and/or —COOM in a molecular structure, wherein M represents a counter ion.

8. The method of producing an optical laminate according to claim 1, wherein the lyotropic liquid crystalline compound contains a polycyclic compound represented by the following formula (I)

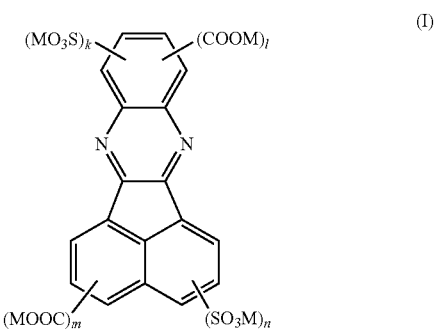

wherein the formula (I), M represents a counter ion, and k, l, m, and n represent a number of substitutions (k and l are an integer from 0 to 4, and m and n are an integer from 0 to 6), where k, l, m, and n are not simultaneously 0.

9. The method of producing an optical laminate according to claim 1, wherein the solution contains water.

10. An image displaying apparatus having an optical laminate obtained by the production method according to claim 1.

* * * * *